STROBED BINARY CODE COMPARATOR HAVING AN INTERROGATION CIRCUIT WHICH INCLUDES SELECTIVELY BIASED DIODE PAIRS
Filed Jan. 20, 1964 2 Sheets-Sheet 1

INVENTOR.
RICHARD F. REARDON
BY Whittemore
Hulbert & Belknap
ATTORNEYS

INVENTOR
Richard F. Reardon 3,297,986

STROBED BINARY CODE COMPARATOR HAVING AN INTERROGATION CIRCUIT WHICH INCLUDES SELECTIVELY BIASED DIODE PAIRS

Richard F. Reardon, Detroit, Mich., assignor, by mesne assignments, to Control Data Corporation, Minneapolis, Minn., a corporation of Minnesota Filed Jan. 20, 1964, Ser. No. 338,843

5 Claims. (Cl. 340—146.2)

The invention relates to apparatus for comparing electric signals and refers more specifically to an electric circuit for use in a line printer or similar apparatus for comparing binary code electric signals and providing an output signal when the compared code signals are not identical.

In many present day apparatus, such as high speed computers, translators and line printers, it is desirable to compare two binary code electric signals and to provide an output signal if the compared signals are not identical.

Circuits for comparing the binary code electric signals should be simple in construction, economical to produce and efficient in use. In the past circuits for comparing binary code electric signals have not met simplicity, economy and efficiency requirements or have been restricted in flexibility, size or weight.

It is one of the purposes of the present invention to provide improved apparatus for comparing electric signals.

Another object is to provide a circuit for comparing binary code electric signals including means for individually comparing the voltages in each position in the binary code signals, means for interrogating each of the compared voltages and means responsive to the interrogating means for providing an output signal from the apparatus representative of the identity condition of the compared binary code signals as determined by each of the compared voltages.

Another object is to provide an electric circuit for comparing a line printer binary code input signal with a binary code signal generated by the line printer code generator, including separate comparison circuits connected to the line printer code input information device and to the line printer code generator, each comprising a separate voltage divider extending therebetween for each position in the binary code signals to be compared, separate interrogating circuits for interrogating each of the voltage divider circuits to determine the identity condition of the voltages in each position in the binary code signals from the input information device and the line printer code generator and signal generating means for generating an output signal from the electric circuit if all the interrogating circuits do not indicate an identity voltage condition on each voltage divider.

Another object is to provide apparatus for comparing electric signals which is simple, economical and efficient.

Other objects and features of the invention will become apparent as the description proceeds, especially when taken in conjunction with the accompanying drawing, illustrating a preferred embodiment of the invention, wherein.

Figure 1:
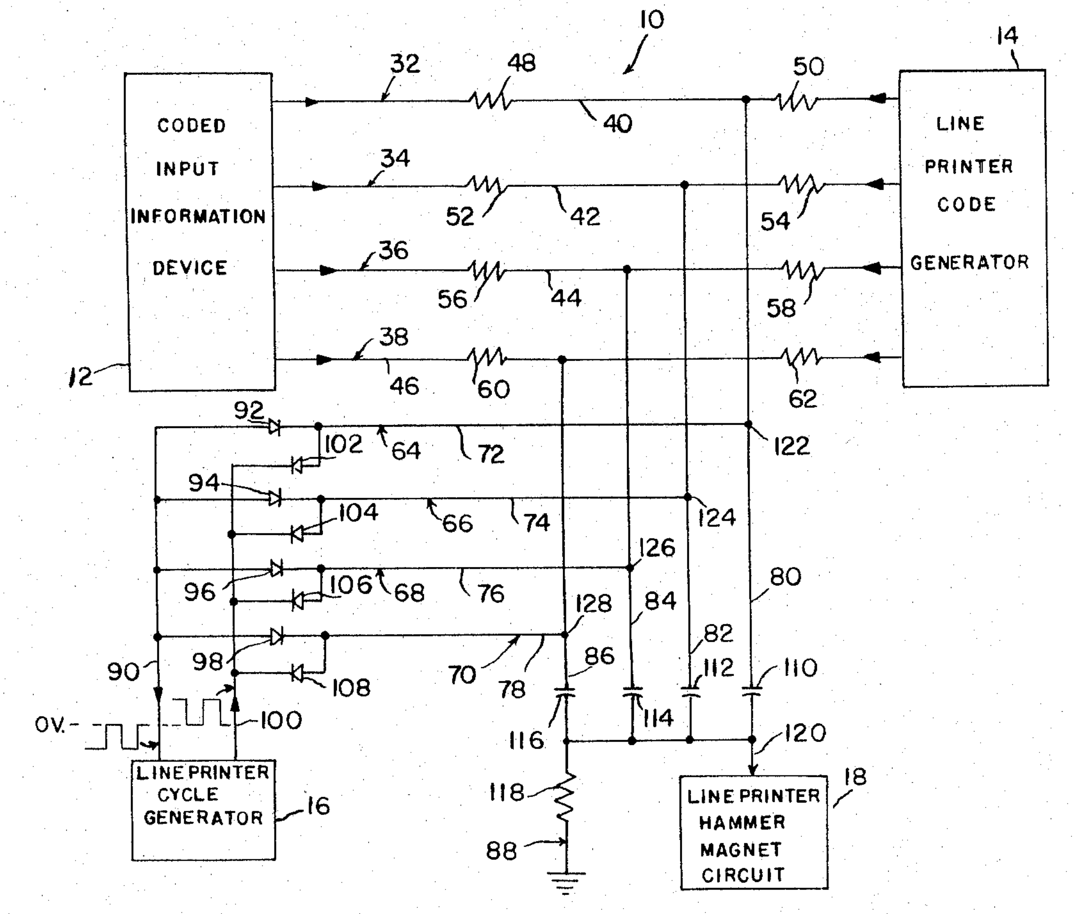
FIGURE 1 is a schematic diagram of a circuit for comparing binary code electric signals in combination with a line printer shown in block form.

As shown in FIGURE 1, the comparator circuit 10 is in the environment of a line printer similar to that disclosed in Patent No. 3,185,075. The printer has a code generator as at 14 herein, for generating a binary code electric signal representative of a character in position to be printed and a hammer magnet circuit 18 for causing printing of the character when no output signal is present from the comparator circuit 10. The line printer of which the circuit 10 is a part further includes a cycle generator 16 for providing timed interrogating signals of predetermined magnitude which will be considered subsequently.

An input information device 12 for supplying binary code electric input signals to the comparator circuit 10 for comparison with the binary code electric signals from the code generator 14 is shown operatively connected to the line printer comparator circuit.

The construction, function and operation of line printers including code generators 14 and hammer magnet circuits 18 and the construction, function and operation of input information devices 12 are fully disclosed in Patent No. 3,185,075 and are not considered in detail here.

Referring specifically to the comparator circuit 10, there is provided four separate voltage divider circuits 32, 34, 36 and 38. The voltage divider circuits include conductors 40, 42, 44 and 46 respectively, having matched impedance members 48 and 50, 52 and 54, 56 and 58, and 60 and 62 respectively therein. The conductors 40, 42, 44 and 46 in the figure are connected to the code generator 14 at the right end thereof and are connected at the left end to the input information device 12.

In operation, for every separate binary code signal generated by the code generator 14 a distinct zero volt or plus 10 volt signal will be fed to the right end of each of the conductors. The zero volt signal may represent a zero binary code logic value while the plus 10 volt signal may represent a one binary code logic value.

Simultaneously at the other end of the conductors 40, 42, 44 and 46 a binary code signal represented by distinct zero voltage, zero logic level or minus 10 volts, one logic level will be provided from the input information device for comparison with the signals from the code generator 14.

The comparator circuit 10 further includes the interrogating circuits 64, 66, 68 and 70 operably associated with the voltage divider circuits 32, 34, 36 and 38, respectively. The interrogating circuits 64, 66, 68 and 70 include the conductors 72, 74, 76 and 78 connected respectively to the conductors 40, 42, 44 and 46 through conductors 80, 82, 84 and 86 and connected respectively to the conductor 90 through diodes 92, 94, 96 and 98. Conductors 72, 74, 76 and 78 are further connected to the conductor 100 through diodes 102, 104, 106 and 108.

In operation the cycle generator 16 operates to provide a negative ten volts on conductor 90 and a positive ten volts on the conductor 100 and to periodically ground each conductor 90 and 100 at separate times during a code cycle of code generator 14. Thus during each cycle of the code generator 14 the conductor 90 goes from minus 10 volts to zero volts, while the conductor 100 goes from plus 10 volts to zero volts.

The output circuit 88 includes the separate capacitors 110, 112, 114 and 116 in the respective conductors 80, 82, 84 and 86. The output circuit 88 is completed with the load resistor 118 connected in parallel with the hammer magnet circuit 18 which is connected to the output conductor 120 of the output circuit 88.

In over-all operation of the comparator circuit 10 it will be assumed that binary code input information has been fed from the input information device 12 to the left end of voltage divider circuits 32, 34, 36 and 38. A series of binary code signals will be produced by the line printer code generator 14 and compared with the input information. When the signal produced by the code generator is identical to that produced by the input information device no output is produced from the comparator circuit and the hammer magnet circuit 18 is actuated.

In accordance with the above indicated binary code signal logic level values during comparison of any two binary code signals the possible combination of voltages at the opposite ends of each of the conductors 40, 42, 44 and 46 will thus be 0 and 0, 0 and +10, −10 and 0, and −10 and +10. 0 and 0 voltages at the opposite ends of the conductors 40, 42, 44 and 46 and −10 and +10 voltage thereat will produce a 0 voltage between the matched pairs of impedance members 48 and 50, 52 and 54, 56 and 58, and 60 and 62, while a 0 and −10 volts will produce a −5 volts between the impedance members and a 0 and +10 volts will produce a +5 volts between the impedance members.

Figure 2:
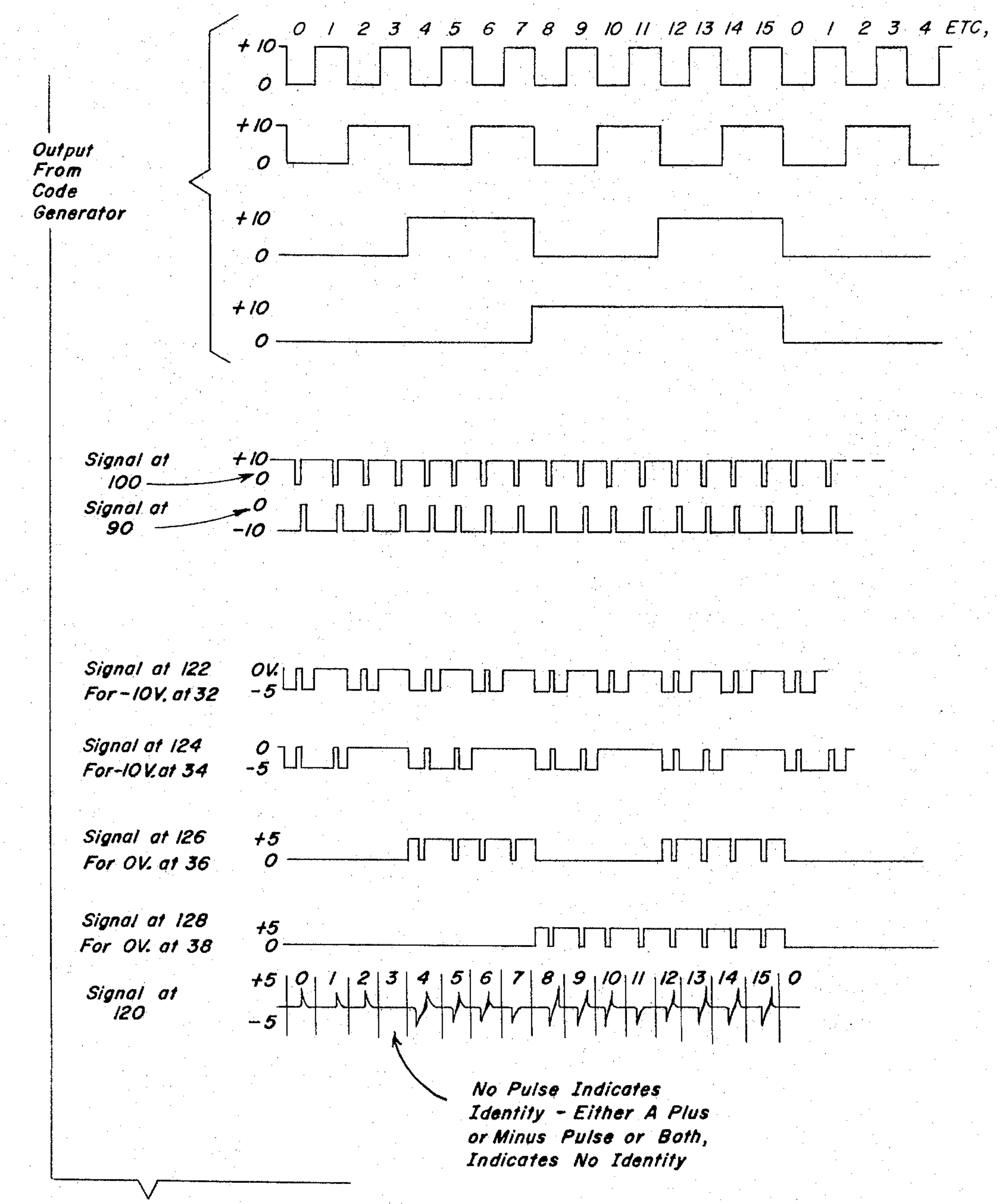
FIGURE 2 is a view showing curves at the top thereof representing typical outputs from the code generator of FIGURE 1, and the curves below these representing typical signals at various places in the circuit of FIGURE 1.

Thus it will be seen that on identical binary coded zero or one logic levels at the opposite ends of the conductors 40, 42, 44 and 46 that there will be no voltage at the junctions 122, 124, 126 and 128 but that on no identity of logic levels on the opposite ends of any one of the conductors that either +5 or −5 volts will be found at the respective junction 122, 124, 126 or 128. The explanatory curves at the lower part of FIGURE 2 are waveforms keyed by legends and numerals to the circuit of FIGURE 1.

With either a −5 or +5 volts at a junction 122, 124, 126 or 128 no initial flow of current through the diodes 92, 94, 96, 98, 102, 104, 106 and 108 is possible since the diodes are biased in a reverse direction by the −10 volts on the conductor 90 and the +10 volts on the conductor 100. Similarly during each character cycle, as the voltage on the conductors 90 and 100 go to 0 no current will flow through the diodes if a zero voltage is found at junctions 122, 124, 126 and 128 since the diodes will remain biased in a cut-off direction.

However, if for example a −5 volts is present due to a non-identity of an information bit in the binary code signal of the code generator as compared with the binary code signal of the input information device when the signal on conductor 90 from cycle generator 16 goes to 0 volts, the diode 92, 94, 96 or 98 associated with the junction 122, 124, 126 or 128 at which the −5 volts is present from the voltage divider circuit 32, 34, 36 or 38 will be biased in a conducting direction and current will flow from the respective junction through the respective diode through conductor 90 and power supply 16 and through the load resistor 118 to produce a signal surge through the particular capacitor 110, 112, 114 or 116 associated with the junction at which the −5 signal is present. A signal is thus provided the hammer magnet 18 providing the binary code signal from the input information device is not identical to the binary code signal of the code generator.

With a −5 signal at a junction 122, 124, 126 or 128 the grounding or providing a 0 voltage on conductor 100 would produce no signal through the diodes 102, 104, 106 and 108 associated therewith since the diodes would again be biased in a reverse direction. However, should a +5 signal be present at a junction or junctions 122, 124, 126 or 128, a signal would be provided through the diodes 102, 104, 106 or 108 rather than through diodes 92, 94, 96 or 98

Thus a signal output is provided on the output conductor 120 at any time any individual corresponding logic level voltages from code generator 14 and input information device 12 are not identical. Only when the binary coded signal from the code generator and input information device are identical will there be 0 voltage at each junction 122, 124, 126 and 128 and therefore no output signal on conductor 120.

Considering a specific code example, attention is directed to the upper part of FIGURE 2. The waveforms show the code generator advancing through sixteen possible codes while the input remains constant at a particular code. In this case the input code is 0011 where "1" corresponds to −10 volts and "0" corresponds to zero volts. When the code generator has advanced to 0011 (where "1" in this case corresponds to +10 volts and "0" corresponds to zero volts), there will be pulse output at conductor 120 (see the lower part of FIGURE 2). No pulse output will indicate identity. For all other code combinations from the code generator, there will be a negative pulse, a positive pulse, or both negative and positive pulses at conductor 120. After the code generator has advanced through the sixteen possible codes, the input will be changed to a different code and again this code will be compared to the code generator outputs.

While the comparator circuit 10 has been described in conjunction with a line printer, it will be understood that the comparator circuit 10 of the invention is of general application and may be used to provide either an output signal or no output signal as desired on comparison of two binary coded signals in accordance with the identity condition thereof. Further it will be understood that the number of significant positions in the binary code signals which may be handled by a comparator circuit, such as comparator circuit 10, are theoretically unlimited.

While one embodiment of the present invention has been disclosed in detail, it will be understood that other embodiments and modifications thereof are contemplated. It is the intention to include all embodiments and modifications as are defined by the appended claims within the scope of the invention.

What I claim as my invention is:

1. A circuit for comparing a pair of electric signals comprising averaging means for developing an average signal representative of the averaged magnitude of the two signals, said averaging means including a voltage divider circuit having a conductor and two matched impedance members in series therein, the signals to be compared being fed to the opposite ends of the conductor, interrogating means operably associated with the averaging means for interrogating said average signal to determine the magnitude thereof, said interrogating means comprising a separate conductor connected between the impedance members in the averaging means, a pair of oppositely polarized diodes connected in parallel with each other and in series in the last-mentioned conductor, means for biasing each of said diodes in a reverse direction and means for separately removing the bias from the diodes, and means responsive to the interrogating means for providing an output signal representative of the identity condition of the two electric signals as determined by the magnitude of the average signals.

2. Structure as set forth in claim 1 wherein the means for providing an output signal comprises a capacitor one side of which is connected between the impedance members, a load resistor connected to the other side of the capacitor, and an output conductor connected between the capacitor and load resistor.

3. A circuit for comparing a pair of binary code electric signals each including separate voltages in significant binary code positions comprising separate averaging means for developing a separate average signal representative of the average magnitude of each pair of separate voltages in the same significant binary code position in the compared signals, each of the separate averaging means including a voltage divider circuit having a conductor and two matched impedance members in series therein, the voltages in the same significant position in the binary code electric signals being fed to the opposite ends of the same voltage divider circuit, separate interrogating means operably associated with each of the averaging means for interrogating said average signals to determine the magnitude thereof, each of the interrogating means comprising a different conductor connected between the matched impedance members in the respective averaging means, a pair of oppositely polarized diodes connected in parallel with each other and in series in the last-mentioned conductors, means for biasing each of the diodes in a reverse direction, means for separately removing the bias from the diodes, and separate means responsive to each of the interrogating means for providing an output signal representative of the identity condition of the two voltages compared by the respective averaging means as determined by the developed average signal interrogated.

4. Structure as set forth in claim 3 wherein each of the separate output means comprises a common grounded load resistor and output conductor in parallel, separate capacitors connected on one side between the impedance members in a respective one of the voltage divider circuits and on the other side in series with the output conductor and load resistor.

5. In a line printer, a circuit for comparing binary code signals from an input information device and a code generator wherein the zero logic level is represented by zero volts in both signals and the one logic level is represented by equal and opposite polarity voltages in the two signals comprising a separate voltage divider circuit for each significant position in the binary code of the signals each including a pair of matched resistors, means for feeding voltages from the same significant positions in the signals to the opposite ends of the same voltage divider circuits, a separate interrogation circuit connected to each of said voltage divider circuits each including a pair of oppositely polarized diodes connected in parallel with each other and connected on one side between the resistors of a respective voltage divider circuit, a cyclically operable bias voltage source, means connected to said source for applying a reverse bias to each of said diodes equal in magnitude to the one logic level voltages of the compared signals and for separately removing said bias from said pair of diodes during comparing of each pair of binary code signals, and an output circuit including a separate capacitor connected on one side between each of said matched resistors, a common output resistor connected to the other side of each of said capacitors and an output conductor connected to the output resistor.

References Cited by the Examiner

UNITED STATES PATENTS

| | | | |
|---|---|---|---|
| 2,641,696 | 6/1953 | Woolard | 340—146.2 |
| 2,685,039 | 7/1954 | Scarbrough et al. | 307—88.5 |
| 2,752,489 | 6/1956 | Aigrain | 340—146.2 |
| 2,762,936 | 9/1956 | Forrest | 307—88.5 |
| 2,811,707 | 10/1957 | Henning et al. | 340—146.2 |
| 2,979,695 | 4/1961 | Tyrlick et al. | 340—146.2 |
| 2,990,477 | 6/1961 | MacIntyre | 307—88.5 |
| 2,994,789 | 8/1961 | Gottfried | 307—88.5 |
| 3,077,544 | 2/1963 | Connelly | 307—88.5 |
| 3,183,373 | 5/1965 | Sakurai | 307—88.5 |
| 3,215,985 | 11/1965 | Marsh | 340—146.2 |

OTHER REFERENCES

Pages 96–97, April 1960, Leightner, R. A., Multiple Ring, Sum Logic Unit. IBM Technical Disclosure Bulletin vol. 2, No. 6.

Pages 55–56, 1957, Richards, R. K., Digital Computer Components and Circuits. D. Van Nostrand, N.J.

ROBERT C. BAILEY, *Primary Examiner.*

MALCOLM A. MORRISON, J. P. VANDENBURG, *Assistant Examiners.*